(12) United States Patent
Teeple

(10) Patent No.: US 6,733,028 B2
(45) Date of Patent: May 11, 2004

(54) TOWING MECHANISM

(76) Inventor: Robert A. Teeple, 6724 W. US Highway 6, Gibsonburg, OH (US) 43431

( * ) Notice: Subject to any disclaimer, the term of this patent is extended or adjusted under 35 U.S.C. 154(b) by 0 days.

(21) Appl. No.: 10/221,370

(22) PCT Filed: Mar. 21, 2001

(86) PCT No.: PCT/US01/40347
§ 371 (c)(1),
(2), (4) Date: Sep. 11, 2002

(87) PCT Pub. No.: WO01/70522
PCT Pub. Date: Sep. 27, 2001

(65) Prior Publication Data
US 2003/0102649 A1 Jun. 5, 2003

Related U.S. Application Data
(60) Provisional application No. 60/191,218, filed on Mar. 22, 2000.

(51) Int. Cl.$^7$ ................................................. B60D 1/00
(52) U.S. Cl. ................................. 280/476.1; 280/461.1
(58) Field of Search ......................... 280/476.1, 455.1, 280/456.1, 461.1, 493

(56) References Cited

U.S. PATENT DOCUMENTS

| | | | | |
|---|---|---|---|---|
| 2,254,532 A | * | 9/1941 | Knox | 280/418 |
| 2,498,779 A | * | 2/1950 | Winchester | 280/405.1 |
| 3,663,039 A | * | 5/1972 | Morgan | 280/408 |
| 3,815,939 A | * | 6/1974 | Pettay | 280/474 |
| 3,865,405 A | | 2/1975 | Mitchell et al. | |
| 5,348,332 A | * | 9/1994 | Hamilton | 280/476.1 |
| 5,382,041 A | | 1/1995 | Keith | |
| 5,531,468 A | | 7/1996 | White | |
| 5,860,670 A | * | 1/1999 | Aubin | 280/476.1 |
| 6,036,217 A | | 3/2000 | Burkhart, Sr. et al. | |
| 6,182,997 B1 | | 2/2001 | Ullrich et al. | |
| 6,273,447 B1 | * | 8/2001 | Vande Berg | 280/476.1 |
| 6,290,248 B1 | * | 9/2001 | Yrigoyen | 280/476.1 |

* cited by examiner

Primary Examiner—Daniel G. DePumpo
(74) Attorney, Agent, or Firm—MacMillan, Sobanski & Todd; Donald R. Fraser

(57) ABSTRACT

A towing mechanism (10) for a vehicle having an independent axle and wheel assembly and a linkage for adjusting the height of the towing mechanism (10) to accommodate a variety of trailers, whereby the towing mechanism (10) militates against the weight of a towed vehicle from being borne solely by a towing vehicle frame (40) and suspension.

19 Claims, 3 Drawing Sheets

TOWING MECHANISM

CROSS-REFERENCE TO RELATED APPLICATION

This application claims the benefit of U.S. provisional patent application Ser. No. 60/191,218, filed Mar. 22, 2000.

FIELD OF THE INVENTION

The present invention relates to a towing mechanism and more particularly to a towing mechanism having an axle and a plurality of ground engaging wheels to connect a towing vehicle and a trailer, whereby the towing mechanism militates against the weight of the trailer from being borne solely by the towing vehicle frame and suspension.

BACKGROUND OF THE INVENTION

A towing mechanism such as a hitch, for example, is frequently added to a vehicle for the purpose of towing a trailer. The trailer adds extra weight to the towing vehicle which is concentrated on the rear axle, suspension, and frame of the towing vehicle. The additional weight of the trailer creates stress concentrations which may result in damage to the towing vehicle. Additionally, handling and braking of the towing vehicle are adversely affected by the added weight of the trailer.

Trailer towing devices, such as disclosed in U.S. Pat. No. 5,860,670, have attempted to address the added weight problem. However, maneuvering, especially when moving in reverse, of a trailer connected to a towing vehicle using the device disclosed in the '670 patent is complicated since the axle of the towing device moves independently of the axle of the towing vehicle.

It would be desirable to produce a towing mechanism which minimizes the weight and stress placed on the rear axle, suspension and frame of the towing vehicle, while maintaining the axle of the towing mechanism essentially parallel with the axle of the towing vehicle.

SUMMARY OF THE INVENTION

Consistent and consonant with the present invention, a towing mechanism which minimizes the weight and stress placed on the rear axle, suspension and frame of the towing vehicle, while maintaining the axle of the towing mechanism essentially parallel with the axle of the towing vehicle, has surprisingly been discovered. The towing mechanism comprises: a main frame; a receiving frame disposed on the main frame, wherein the receiving frame and the main frame are adapted to permit relative vertical movement and to militate against horizontal relative movement therebetween; ground engaging means disposed on the main frame; wherein one of the main frame and the receiving frame is adapted for attachment to the trailer; and wherein the other of the main frame and the receiving frame is adapted for attachment to the vehicle.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
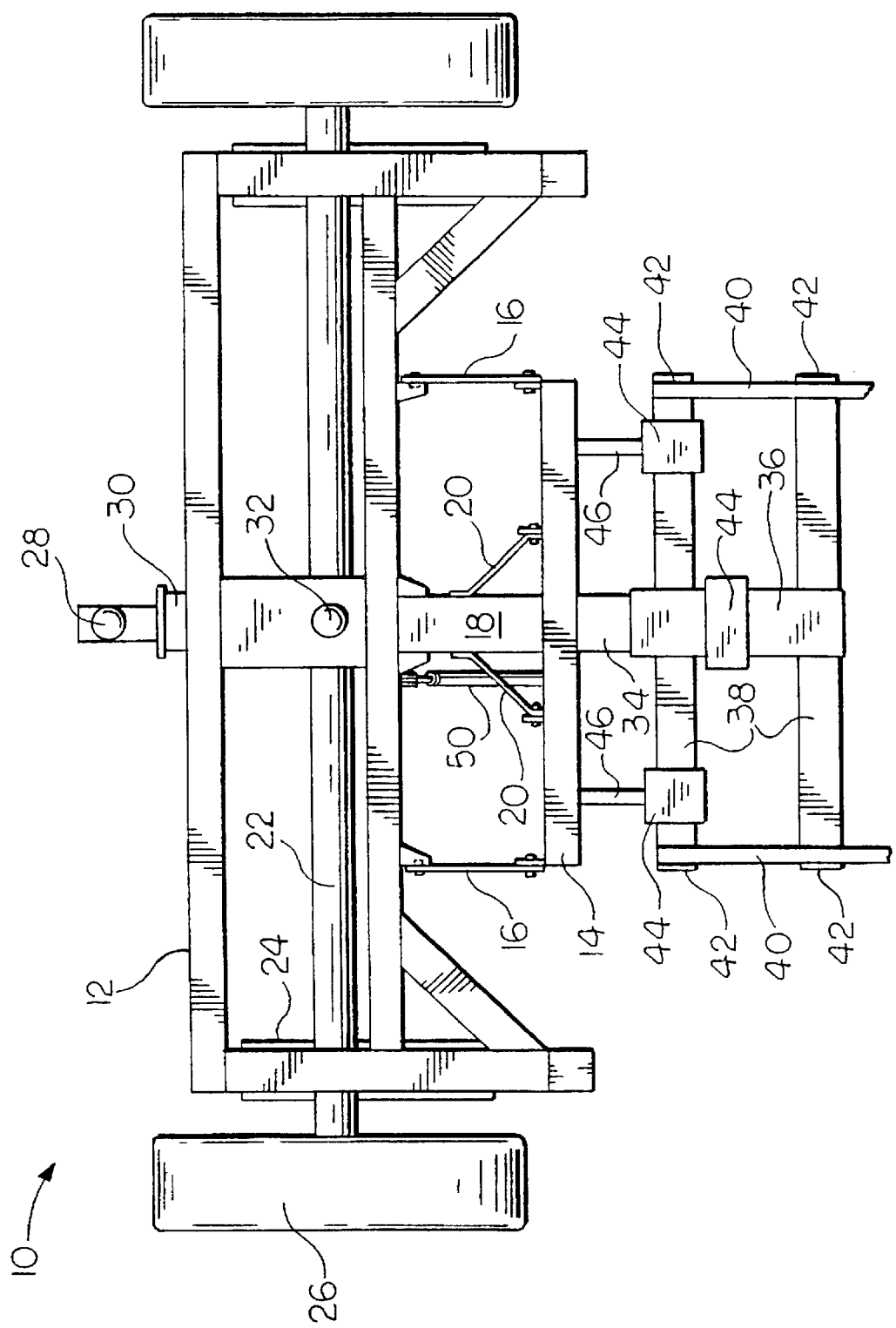
FIG. 1 is a top view of the towing mechanism incorporating the features of the invention.

Referring now to the drawings, and particularly FIG. 1, there is shown generally at 10 a towing mechanism incorporating the features of the invention. The towing mechanism 10 includes a main frame 12 and a receiving frame 14. A plurality of linkage arms 16 are pivotally disposed between the main frame 12 and the receiving frame 14. In the embodiment illustrated in FIGS. 1, 2, and 3, the linkage arms 16 are disposed between a top portion and bottom portion of the main frame 12 and the receiving frame 14. A pair of main linkages 18 is also pivotally disposed between the main frame 12 and the receiving frame 14. Several mounting holes are provided on the main frame 12 and the receiving frame 14 for each of the linkage arms 16 and each of the main linkages 18 to adjust and position the main frame 12 as desired. In the embodiment shown, a pair of stabilizers 20 is disposed on opposing sides one of the main linkages 18. The stabilizers 20 are angularly disposed with respect to the linkage arms 16 and the main linkage 18. Grease fittings (not shown) are provided at the pivotal connections between the linkage arms 16 and the main frame 12 and the receiving frame 14 and between the main linkages 18 and the main frame 12 and the receiving frame 14 to provide lubrication. Bushings (not shown) are also provided at the pivotal connections.

Figure 2:
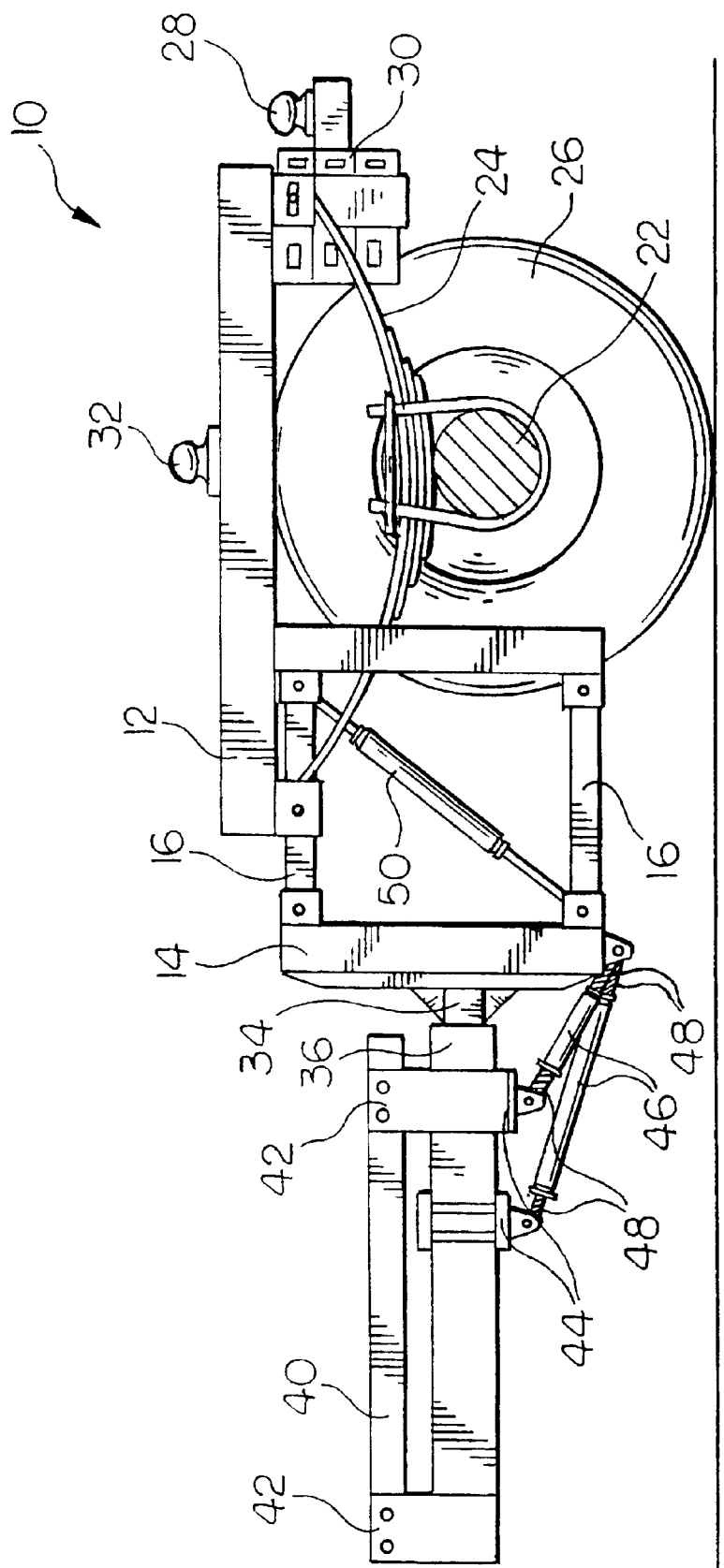
FIG. 2 is a sectional view taken along line 2—2 of the towing mechanism illustrated in FIG. 1.
Figure 3:
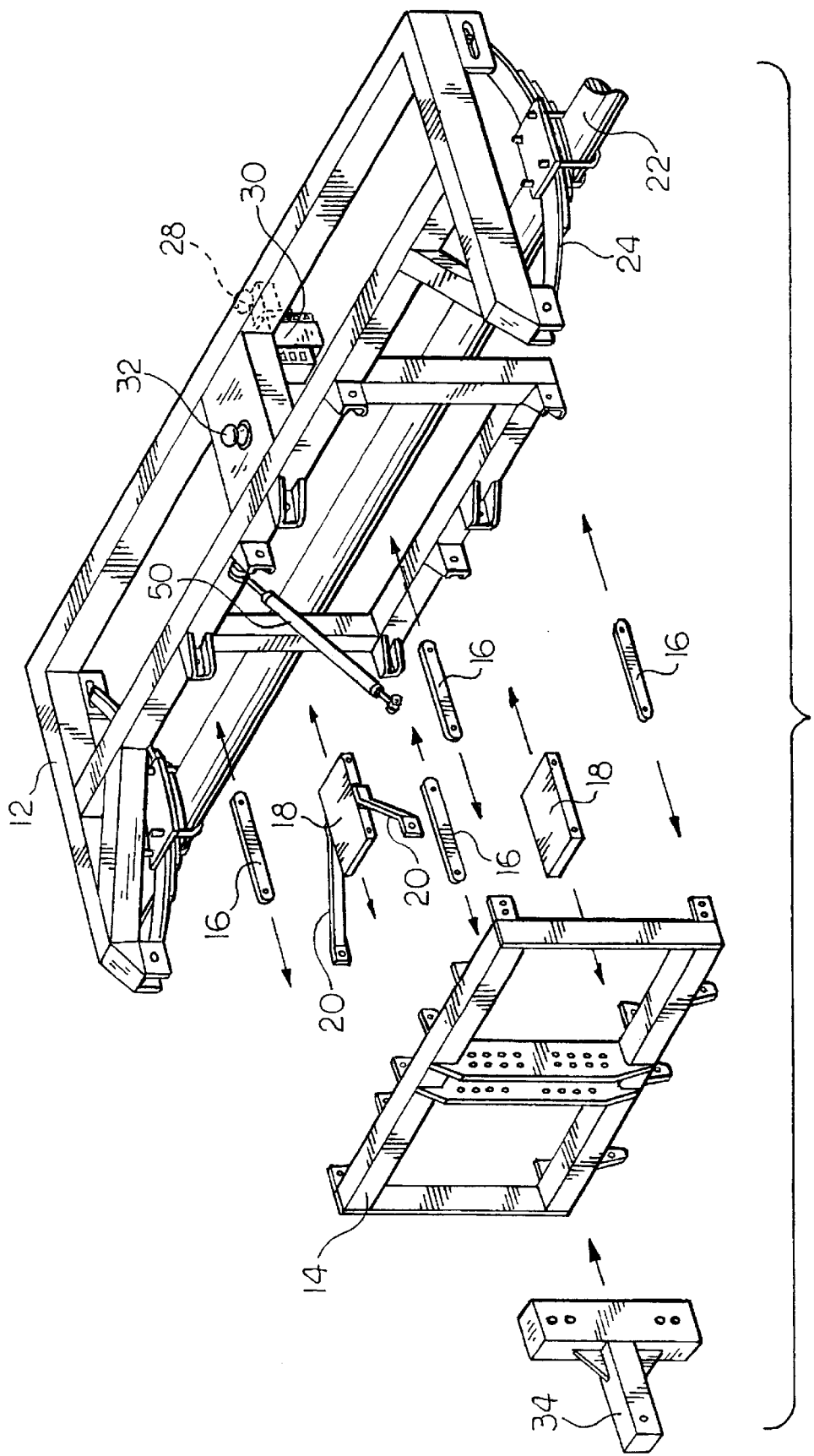
FIG. 3 is an exploded perspective view of the towing mechanism illustrated in FIGS. 1 and 2.

An axle 22 is horizontally disposed on the main frame 12. In the embodiment shown, the axle 22 is shown rearwardly of a vertical frame portion of the main frame 12. It is understood that the axle 22 can be disposed forward of the vertical frame portion of the main frame 12. A pair of leaf springs 24 is attached to the ends of the axle 22, as illustrated in FIGS. 2 and 3. One end of each of the leaf springs 24 is pivotally disposed on the main frame 12. The other end of each of the leaf springs 24 is slidingly disposed on the main frame 12. Ground engaging wheels 26 are disposed at opposing ends of the axle 22 adjacent the leaf springs 24. In the embodiment shown, a single wheel 26 is used. However, it is understood that other wheel configurations could be used such as dual wheels, for example. It is also understood that another axle type could be used such as a torsion axle, for example.

A male trailer hitch receiver and ball 28 is disposed on the rear portion of the main frame 12. A female trailer hitch receiver 30 accepts the male receiver and ball 28. In the embodiment shown a plurality of female trailer hitch receivers 30 are provided to mount the male receiver and ball 28 at different heights to accommodate trailers having hitches disposed at various heights. A fifth wheel hitch ball 32 is disposed on the main frame 12 for use with a fifth wheel type trailer (not shown).

A male receiver 34 is disposed on the receiving frame 14 to connect to a female receiver 36 disposed on a towing vehicle (not shown). The size of the male receiver 34 is determined by the rated towing capacity of the towing vehicle. The male receiver 34 is in axial alignment with the main linkages 18. Therefore, the load of a trailer being towed is directed through the main linkages 18 which must be structurally strong enough to carry the load of the trailer. As illustrated in FIG. 3, the male receiver 34 can be mounted in a variety of vertical positions using different bolt hole locations to accommodate varying female receiver 36 heights.

Cross members or braces 38 are fixedly attached to the frame 40 of the towing vehicle by fastening brackets 42, or any conventional means. The cross members 38 secure the female receiver 36 to the frame 40 of the towing vehicle and extend laterally of the female receiver 36 in a substantially parallel relation to the towing vehicle axle (not shown) Brackets 44 are adjustably disposed on the female receiver 36 and the cross members 38 and may be fixed in a desired position.

Support arms 46 are disposed between the receiving frame 14 and the brackets 44 of the female receiver 36 and the cross members 38. One end of each of the support arms 46 is pivotally disposed on the brackets 44 of the female receiver 36 and the cross members 38. The other end of each of the support arms 46 is pivotally disposed on the lower portion of the receiving frame 14. The length of the support arms 46 may be adjusted by rotating the central portion of the support arms 46 thereby causing the threaded rod ends 48 to move inwardly or outwardly as desired, as illustrated in FIG. 2. It is understood that other adjustment means may be used. By adjusting the length of the support arms 46, the position of the receiving frame 14 can be varied relative to the female receiver 36. The adjustment of the support arms 46 permits the axle 22 of the towing mechanism 10 to be aligned with the towing vehicle axle.

A shock absorber or stabilizer 50 is disposed between the main frame 12 and the receiving frame 14. The shock absorber 50 militates against excessive oscillation or bouncing of the towing mechanism 10 during use. It is understood that other means such as adjustable springs, for example, can be used. The spring tension can be adjusted to vary the load on the receiving frame 14. As the load on the receiving frame 14 is varied, the load is also varied on the towing vehicle which shares the load with the receiving frame 14. Therefore, the traction of the towing vehicle can be adjusted through weight adjustment to compensate for slippery road conditions or the load on the towing vehicle can be reduced when the towing vehicle is carrying a separate load such as in the bed of a truck, for example. Brackets or cross members could also be used, albeit less reliably, to rigidly fix the main frame 12 and rely on the towing vehicle frame 40 and suspension for stability.

In operation, the male receiver 34 of the towing mechanism 10 is connected to the female receiver 36 of the towing vehicle and the support arms 46 are connected to the brackets 44. The male receiver and ball 28 of the towing mechanism 10 are connected to the trailer being towed. Once connected, the axle 22 and the leaf springs 24 support and absorb the load of the trailer being towed. The end of the leaf springs 24 slidingly disposed in the main frame 12 of the towing mechanism permit the spring end to slide during loading and unloading of the spring 24. It is understood that additional equipment can be added to improve the ridability and controllability of the towing mechanism such as shock absorbers, for example.

The linkage arms 16, main linkages 18, and stabilizers 20 cooperate to maintain the axle 22 substantially parallel with the towing vehicle axle. The receiving frame 14 is substantially rigidly held by the female receiver 36 of the towing vehicle and the support arms 46. Horizontal lateral movement of the main frame 12 with respect to the receiving frame 14 is restricted by the linkage arms 16, main linkages 18, and stabilizers 20. However, limited vertical lateral movement of the main frame 12 with respect to the receiving frame 14 is permitted since the linkage arms 16, main linkages 18, and stabilizers 20 pivotally connect the main frame 12 and the receiving frame 14. The pivotal connection helps maintain the main frame 12 substantially horizontal during use. Additionally, the pivotal connection causes the main frame 14 of the towing mechanism 10 to carry the load of the trailer being towed, and militates against the weight of the trailer being borne by the towing vehicle.

Though the basic towing mechanism has been described, it is understood that a host of optional equipment could be added to the towing mechanism 10 for various usages and conditions. Fenders (not shown) may be added to cover the wheels 26 of the towing mechanism 10. The fenders reduce spray during wet weather and serve to protect the trailer being towed from flying debris caused by the tires. Wire harnesses (not shown) to electrically connect the trailer and the towing vehicle, including electrically assisted brakes, may also be disposed on the towing mechanism. Tail lights, turn signals, and license plate lights may also be added to the towing mechanism to be used when the towing mechanism 10 is connected to the towing vehicle but no trailer is being towed. A dolly or jack (not shown) may be added to maintain the forward portion of the towing mechanism in an elevated position to facilitate easy attachment to the towing vehicle. Additionally, a bed extension for a pickup truck, a tow truck attachment, a dump bed attachment, a tool box attachment, and a lift gate could all be added to reduce the burden on the towing vehicle A braking system may also be added to the towing mechanism 10 to help in stopping the towing vehicle, the towing mechanism 10, and the trailer.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A towing mechanism for linking a vehicle and a trailer, the towing mechanism comprising:

a main frame;

a receiving frame;

linkage interconnecting said main frame and said receiving frame to permit relative vertical movement and to militate against relative horizontal movement between said main frame and said receiving frame; and ground engaging means disposed on said main frame, whereby one of said main frame and said receiving frame is adapted for attachment to the trailer and the other of said main frame and said receiving frame is adapted for attachment to the vehicle.

2. The towing mechanism according to claim 1, wherein said ground engaging means is an axle having a plurality of ground engaging wheels disposed thereon.

3. The towing mechanism according to claim 2, wherein the axle includes suspension means disposed between said main frame and the axle.

4. The towing mechanism according to claim 3, wherein the suspension means is a plurality of leaf springs.

5. The towing mechanism according to claim 1, including a stabilizer disposed between said main frame and said receiving frame.

6. The towing mechanism according to claim 5, wherein said stabilizer is a shock absorber.

7. The towing mechanism according to claim 5, wherein said stabilizer is at least one spring.

8. The towing mechanism according to claim 7, wherein the at least one spring is adjustable.

9. A towing mechanism for linking a vehicle and a trailer, the towing mechanism comprising:

a main frame adapted for attachment to the trailer;

ground engaging means disposed on said main frame;

a vehicle receiving frame adapted for attachment to the vehicle; and linkage interconnecting said main frame and said receiving frame to permit relative vertical movement and to militate against relative horizontal movement between said main frame and said receiving frame.

10. The towing mechanism according to claim 9, wherein said ground engaging means is an axle having a plurality of ground engaging wheels disposed thereon.

11. The towing mechanism according to claim 10, wherein the axle includes suspension means disposed between said main frame and the axle.

12. The towing mechanism according to claim 11, wherein the suspension means is a plurality of leaf springs.

13. The towing mechanism according to claim 9, including a stabilizer disposed between said main frame and said receiving frame.

14. The towing mechanism according to claim 13, wherein said stabilizer is a shock absorber.

15. The towing mechanism according to claim 13, wherein said stabilizer is at least one adjustable spring.

16. A towing mechanism for linking a vehicle and a trailer, the towing mechanism comprising:

a main frame having a front section and a rear section, the rear section adapted for attachment to the trailer;

ground engaging means disposed on said main frame; and a vehicle receiving frame hingedly disposed on the front section of said main frame, said receiving frame adapted for attachment to the vehicle, wherein said receiving frame and said main frame are adapted to permit relative vertical movement and to militate against horizontal relative movement therebetween.

17. The towing mechanism according to claim 16, wherein said ground engaging means is an axle having a plurality of ground engaging wheels disposed thereon.

18. The towing mechanism according to claim 17, wherein the axle includes suspension means disposed between said main frame and the axle.

19. A towing mechanism for linking a vehicle and a trailer, the towing mechanism comprising:

a main frame;

a receiving frame;

a stabilizer disposed between said main frame and said receiving frame, wherein said stabilizer is one of a shock absorber and a spring;

linkage interconnecting said main frame and said receiving frame to permit relative vertical movement and to militate against relative horizontal movement between said main frame and said receiving frame; and ground engaging means disposed on said main frame, whereby one of said main frame and said receiving frame is adapted for attachment to the trailer and the other of said main frame and said receiving frame is adapted for attachment to the vehicle.

\* \* \* \* \*